(12) United States Patent
Meester

(10) Patent No.: US 6,257,978 B1
(45) Date of Patent: Jul. 10, 2001

(54) FOOD PLANT HARVESTER WITH IMPROVED RECOVERY SYSTEM

(76) Inventor: David Jeffrey Meester, 4442 W. Sierra, Fresno, CA (US) 93722

( * ) Notice: Subject to any disclaimer, the term of this patent is extended or adjusted under 35 U.S.C. 154(b) by 0 days.

(21) Appl. No.: 09/322,353

(22) Filed: May 28, 1999

(51) Int. Cl.[7] .................................................. A01D 17/00
(52) U.S. Cl. .......................................... 460/145; 56/327.1
(58) Field of Search ................................ 56/327.1, 328.1, 56/12.8, 228, 153; 460/144, 145, 133, 146, 147, 148, 149, 150, 114

(56) References Cited

U.S. PATENT DOCUMENTS

| | | | |
|---|---|---|---|
| 3,473,613 | * 10/1969 | Boyce | 171/14 |
| 3,566,881 | * 3/1971 | Link | 130/30 |
| 3,656,488 | * 4/1972 | Dumanowski et al. | 130/30 A |
| 4,147,017 | * 4/1979 | Cortopassi et al. | 56/16.5 |
| 4,157,005 | * 6/1979 | Orlando et al. | 56/228 |
| 4,174,755 | * 11/1979 | Siri | 171/27 |
| 4,232,506 | * 11/1980 | Studer | 56/327 R |
| 4,257,218 | * 3/1981 | McRobert | 56/327 R |
| 4,262,750 | * 4/1981 | Merkley et al. | 171/27 |
| 4,335,570 | * 6/1982 | Fitzmaurice | 56/327 R |
| 4,426,832 | * 1/1984 | Porter | 56/327 R |
| 5,197,269 | * 3/1993 | Meester | 56/327.1 |
| 5,480,353 | * 1/1996 | Garza, Jr. | 460/148 |
| 5,573,459 | * 11/1996 | Meester | 460/145 |
| 5,702,301 | * 12/1997 | Meester | 460/144 |
| 5,860,859 | * 1/1999 | Meester | 460/144 |

FOREIGN PATENT DOCUMENTS 43 13 320 A1 * 10/1994 (DE) ............................. A01D/17/00

* cited by examiner

Primary Examiner—Robert E. Pezzuto
Assistant Examiner—Arpad Fabian Kovacs

(57) ABSTRACT

The invention provides a method and apparatus for recovering food losses from the main recovery system, the handsorters, and the color sorters. A recovery shaker conveyor located beneath the main recovery system to catch food and vines which are tossed off the end of the main recovery system. The food and vines are turned over during the fall, thus loosening some food from the vine. The loosened food falls through the openings in the recovery shaker conveyor onto a recovery cross conveyor which is situated in between the chains of the recovery shaker conveyor and under the handsorters. Food which is rejected by the color sorters also falls onto the recovery cross conveyor and is directed toward a dirt sorter electronic system. The food which is rejected by the handsorters, is placed on a recovery sorter conveyor which is fed into the recovery cross conveyor for re-examination. The dirt, debris, and unsuitable food fall off the recovery cross conveyor through the dirt sorter electronic system to a trash chute and then to the ground. The remaining suitable food is then guided along a recovery feed conveyor which drops the remaining suitable food onto the discharge conveyor, where the suitable food is elevated and discharged into a receiving truck.

19 Claims, 4 Drawing Sheets

FOOD PLANT HARVESTER WITH IMPROVED RECOVERY SYSTEM

BACKGROUND OF THE INVENTION

1. Field of the Invention

This invention generally relates to apparatus for harvesting above-ground food plants, such as fruit or vegetable plants. More particularly, this invention relates to a tailing, or cull recovery system which allows for further recovery of food losses from apparatus for harvesting above-ground food plants.

2. Description of Prior Art

Direct-loading harvesters have been known in the art for many years and have enjoyed wide-spread use in the harvesting of above-ground food plants containing food. The above-ground food plants harvested from these direct-loading harvester varies, and may include a variety of above-ground food plants ranging from tomato plants and other fruit plants to cucumber plants and other vegetable plants. Typically, such harvesters are arranged to harvest above-ground food plants grown in rows, to elevate the harvested above-ground food plants to a shaker brush for separating the food on the above-ground foods plants from their vines, to carry the food from the shaker brush to sorter conveyors where unsuitable food and trash are removed, and finally to elevate the remaining food from the harvester to an attendant truck or trailer for delivery to processing plants.

Often times, the unsuitable food and trash contain suitable food which is mixed in with the trash for a number of reasons. First, many of the suitable food remains entangled in the vine mass. If suitable food remains entangled in the vine mass the suitable food will fall off the end of the shaker conveyor and onto the ground where the suitable food is regarded as trash. Additionally, some suitable food is lost on the sorter conveyor during the hand sorting process, due to the fact that human hand sorters make mistakes and throw suitable food away. Finally, the color sorters which automatically sort out unsuitable food make mistakes and reject suitable food.

This invention provides an improved method and apparatus for recovering food losses from the main recovery system, the handsorters, and the color sorters. This invention provides a recovery shaker conveyor located beneath the main recovery system to catch food and vines which are tossed off the end of the main recovery system. The food and vines are turned over during the fall, thus loosening some food from the vine. The loosened food falls through the openings in the recovery shaker conveyor onto a recovery cross conveyor which is situated in between the chains of the recovery shaker conveyor and under the color sorters. Food which is rejected by the color sorters also falls onto the recovery cross conveyor and is directed toward a dirt sorter electronic system.

In another embodiment of this invention, unsuitable food which is pulled as culls by the handsorters, is placed on a recovery sorter conveyor which is fed into the recovery cross conveyor for re-examination. The dirt, debris, and unsuitable food fall off the recovery cross conveyor through the dirt sorter electronic system to the ground. The remaining food is retrieved by the dirt sorter electronic system onto a recovery feed conveyor which drops the remaining food onto the discharge conveyor, where the food is elevated and discharged into a receiving truck.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
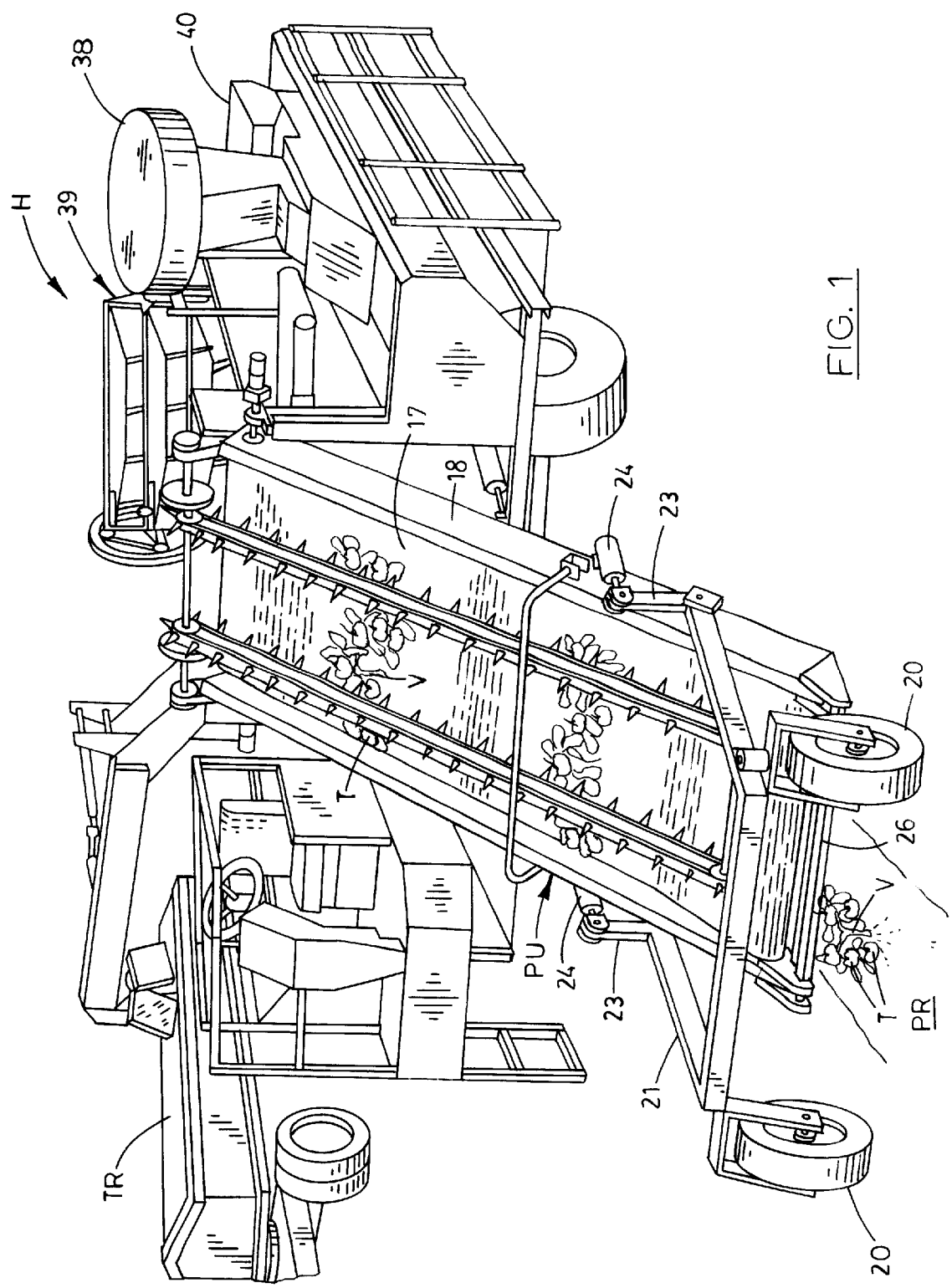
FIG. 1 is a perspective view of a tomato harvester using a preferred embodiment of the invention.

FIG. 1 shows a harvester for harvesting above-ground food plants, according to one preferred embodiment of this invention. While the harvester may be used to harvest a variety of above-ground food plants containing either fruits or vegetables, a tomato harvester H for harvesting tomato plants will be used to describe one preferred embodiment of this invention, as illustrated in FIG. 1. The tomato harvester H is adapted to harvest tomatoes T from vines V grown in a row on an elongated planting ridge PR. The harvester H is designed to proceed along the planting ridge PR, sever the tomato vines V at ground level, elevate the vines V for further processing, separate the tomatoes T from the vines V, and transfer the tomatoes T to an awaiting truck TR. The harvester H includes a pickup mechanism PU comprising a header conveyor 17 mounted in a header frame 18, said header frame 18 being pivotally attached to the main frame of the harvester H. The front end of the header frame 18 is supported by a pair of wheels 20 mounted on a U shaped support frame 21 which is pivotally attached to the front end of said header frame 18. A pair of lever arms 23 extend upward from the U-shaped support frame 21 and are adapted to raise and lower said U-shaped support frame 21 with respect to the front end of the header frame 18. A pair of hydraulic piston and cylinder assemblies 24 are attached to the distal ends of the lever arms 23 at the piston rod and to the header frame 18 at the cylinder end. Actuation of the hydraulic piston and cylinder assemblies 24 allows the distance that the front end of the pickup mechanism PU travels below the ground to be adjusted.

A cutting device is provided at the front end of the pickup mechanism PU to sever the tomato vines V at or near the ground level. The cutting device may be of various types, and a rotating cutting bar 26 is illustrated in FIG. 1. The cutting bar 26 is rotatably attached at both ends to the header frame 18 and is rotated by a hydraulic motor (not shown). As the harvester H is driven forward, the cutting bar 26 encounters the individual vines V and severs them near the ground. After severing, the vines V fall onto the header conveyor 17 and are elevated for further processing on the main frame of the harvester H, as will be described hereinafter.

Figure 2:
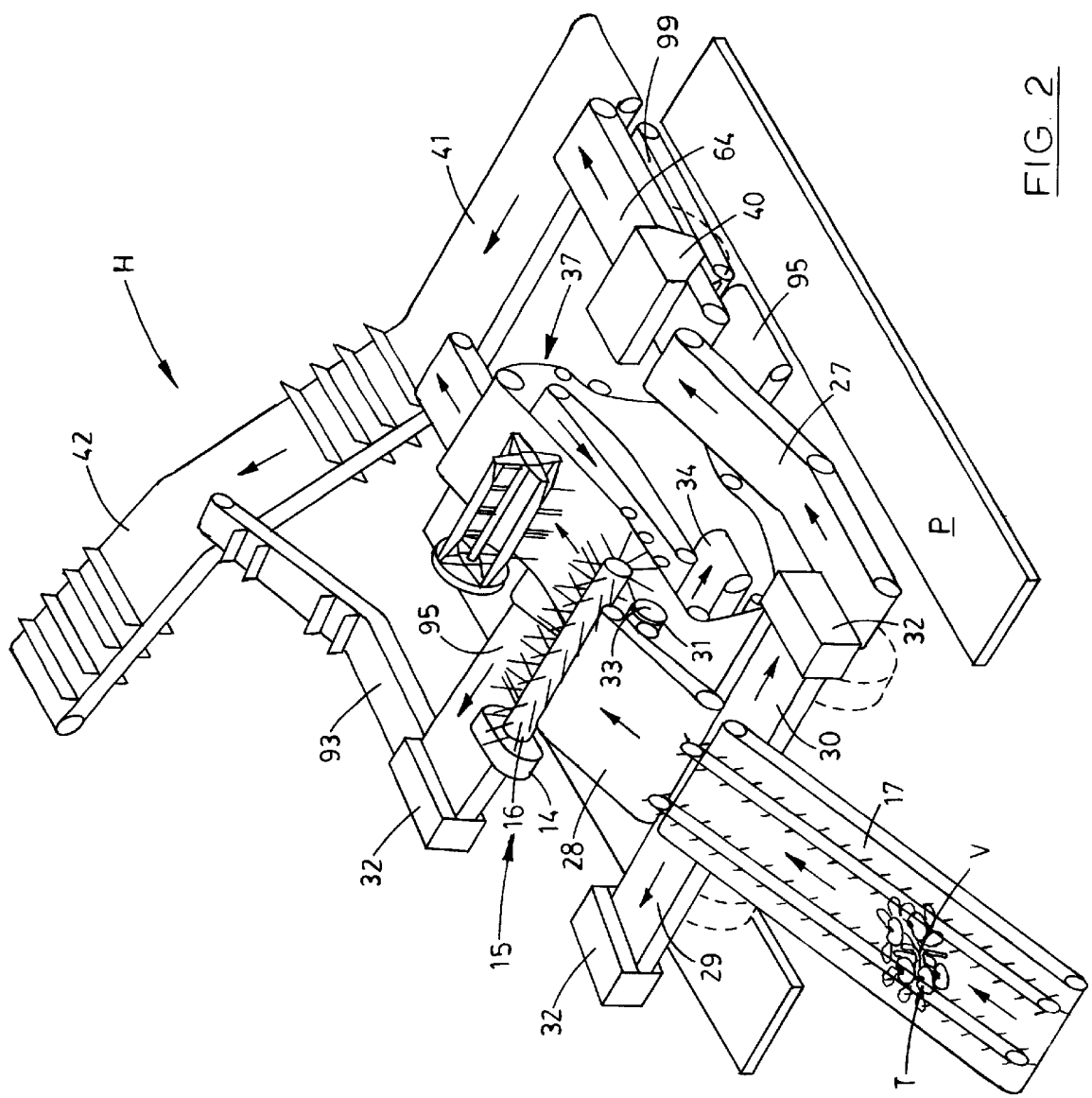
FIG. 2 is a schematic representation of a tomato harvester using a preferred embodiment of the invention, illustrating the paths taken by the tomatoes, vines and debris after they are harvested.

Referring to FIG. 2 the overall operation of the tomato harvester H will now be described in general terms. A longitudinal transfer conveyor 28 is adapted to receive the tomatoes T and vines V from the header conveyor 17. There is a small gap between the discharge end of the header conveyor 17 and the receiving end of the transfer conveyor 28 which allows loose tomatoes, dirt clods and other debris to drop from the vines V in transit. These loose tomatoes and debris fall onto one of two dirt cross conveyors 29, 30 which transfer them to the right side and the left side respectively, of the harvester H (FIG. 2). It should be noted that the further processing undergone on both sides of the harvester H is identical and that such processing will be described only for the left side of the harvester H which is fed by the left dirt cross conveyor 30.

The loose tomatoes, dirt and other debris are discharged from the left dirt cross conveyor 30 through a dirt sorter electronic system 32, where the red tomatoes are retrieved back onto a longitudinal sorter conveyor 27. The dirt, debris, and green tomatoes fall off the conveyor through the dirt sorter electronic system 32 to a trash chute and then to the ground. Sorters, who stand on platform P, manually remove undesirable tomatoes and dirt that may have reached sorter conveyor 27.

Figure 3:
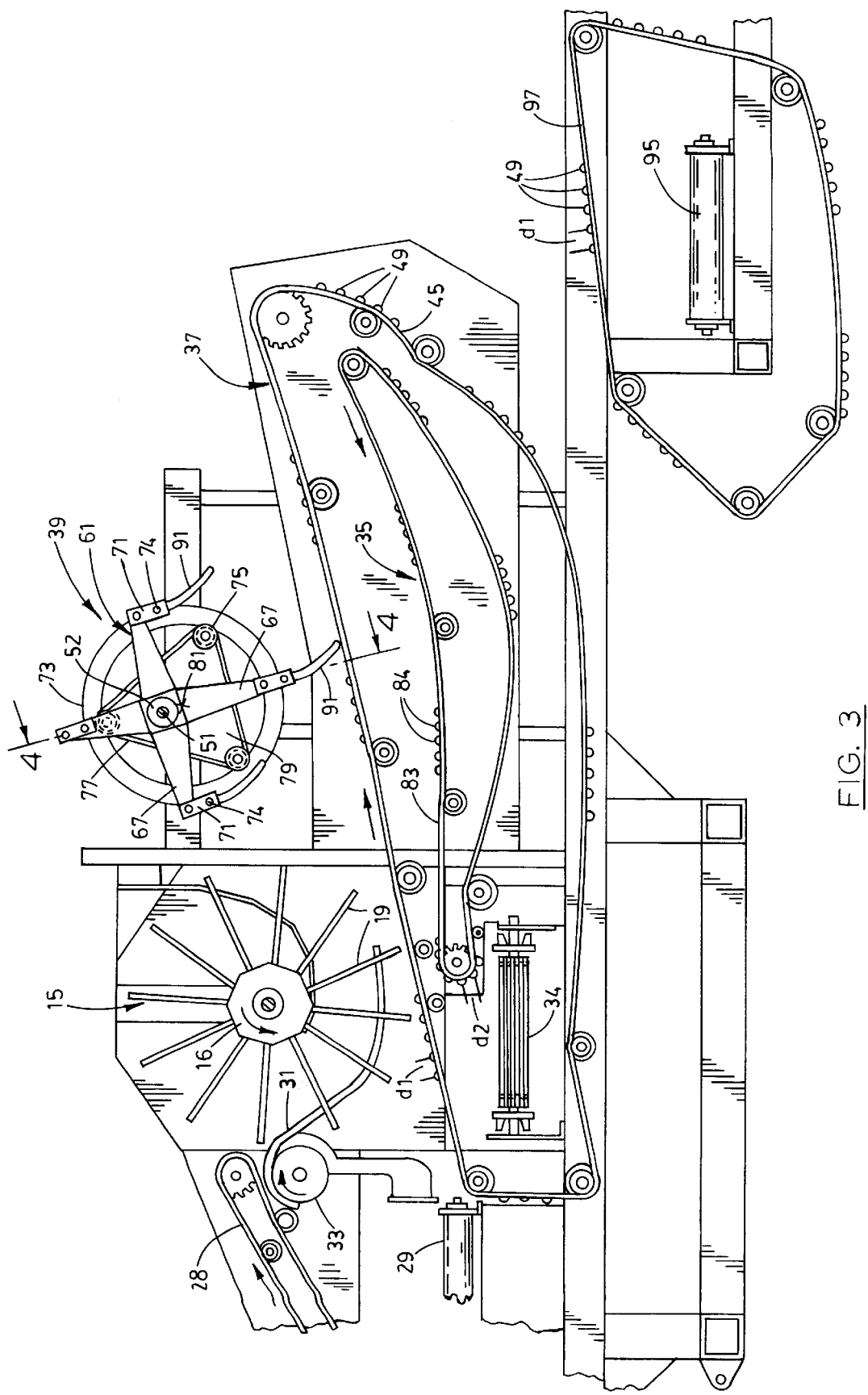
FIG. 3 is a central section of part of the harvester illustrated in FIGS. 1 and 2.

The transfer conveyor 28 discharges vines V with attached tomatoes T to a set of feeder bars 31. The feeder bars 31 direct the vines V under a shaker brush assembly 15, which comprises a shaker brush 16 with shaker brush 16, tines 19, and a device for vibrating the shaker brush 16, such as an eccentric weight assembly 14. When vibrating the shaker brush 16 with an eccentric weight assembly 14, bearing friction in the drive mechanism or a driven shaker brush, also results in the rotation of the shaker brush 16. In the specification and claims a shaker brush is defined as a tined brush that provides rotational oscillation. Gravity and bearing friction from the eccentric weight assembly 14 or the driven shaker brush draw the vines V from the feeder bars 31 to a shaker conveyor 37 which moves the vines V in a rearward direction under the shaker brush 16. The shaker brush 16 is positioned to engage the vines V supported on the shaker conveyor 37. FIG. 3 illustrates a cut away side view of the feeder bars 31, the shaker brush 16, the shaker conveyor 37 and the moving roller 33.

Some of the tomatoes T which have been disengaged by the shaker brush 16 fall through the openings in the shaker conveyor 37 onto either of two food cross conveyors 34. Other tomatoes T which have been disengaged by the shaker brush 16 are caught between vines V, and at first are not able to reach the openings in the shaker conveyor 37. The shaker brush assembly 15 is disclosed in U.S. Pat. No. 5,860,859, incorporated by reference.

The shaker conveyor 37 causes the vines V with loosened tomatoes T to pass below a vine reel 39. The vine reel 39 separates the vines V from the tomatoes T, and allows tomatoes T to fall from the vines V and through the shaker conveyor 37 to a food conveyor 35, located beneath the shaker conveyor 37. The vine reel 39 is disclosed in U.S. Pat. No. 5,197,269, incorporated by reference.

As shown in FIG. 3, the remaining vines V and tomatoes T are conveyed by the shaker conveyor 37 to the rear of the harvester H, where they are allowed to fall onto a recovery shaker conveyor 97. As the vines V fall onto the recovery shaker conveyor 97, the vines V rotate 180° and impact onto the recovery shaker conveyor 97. During rotation and upon impact, some of the tomatoes T are further disengaged from the vines V. Some of the tomatoes T which have been further disengaged by the rotation and the impact fall through the openings in the recovery shaker conveyor 97 onto a recovery cross conveyor 95.

The recovery shaker conveyor 97 comprises a first endless belt and a second endless belt with a plurality of metal rods 49 extending in parallel there between. The first and second endless belts extend under the shaker conveyor. The plurality of rods 49, extending across the recovery shaker conveyor 97, are spaced apart to allow tomatoes T to pass between the rods 49 to the recovery cross conveyor 95 below the recovery shaker conveyor 97. In the preferred embodiment, the plurality of rods 49 are spaced a distance "d1" of 4 inches apart. Preferably, the rods 49 are spaced in the range of 3 inches to 6 inches apart.

Figure 4:
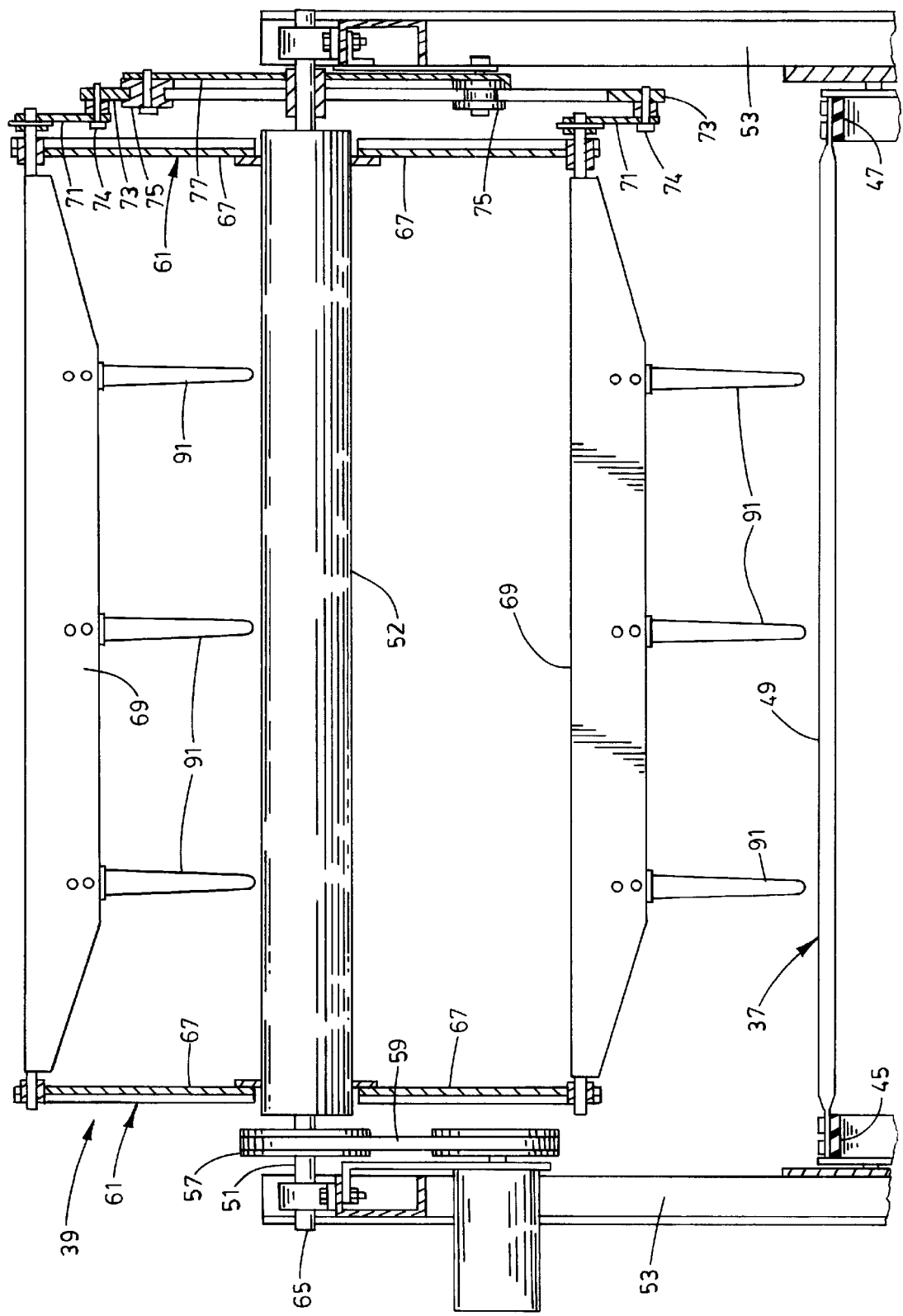
FIG. 4 is a cross-sectional view along lines 4—4 in FIG. 3.

FIG. 4 illustrates the section taken along lines 4—4 of FIG. 3, illustrating the vine reel 39 and the shaker conveyor 37. The vine reel 39 is mounted on a shaft 51, upon which the vine reel 39 rotates. The shaft 51 is mounted on a frame member 53. A reel drive 52, which surrounds a significant length of the shaft 51, is attached to the shaft 51 and driven by the shaft 51. The shaft 51 is driven by a shaft pulley 57, which is driven by a drive belt 59, which is driven by a drive pulley, which is driven by a motor. Spiders 61 are connected to the reel drive 52 and are rotated by the reel drive 52. The shaft 51 and the reel drive 52 pass through the centers of the spiders 61. At the end of each arm 67 of the spiders 61 are bats 69, which extend from an arm 67 of one spider 61 to the arm 67 of another spider 61. The bats 69 are journaled to rotate with respect to the arms 67. At the ends of each bat 69 are flanges 71 with the first end of a flange 71 connected to a bat 69. The second end of each flange 71 is connected to a ring 73 by a pin 74. The ring 73 is mounted on three rollers 75. The rollers 75 are mounted on a reel cam 77. The center 81 between the rollers 75 is offset from the center 65 of the shaft 51 so that the center 65 of the shaft 51 passes through the triangular area 79 at a set distance from the center 81 of the three rollers 75. In this configuration, center 65 of the shaft 51 rotates around center 81 of the three rollers 75. A plurality of tines 91 extend downward from the bats 69.

In operation, the shaker conveyor 37 passes vines V and loosened tomatoes T, which are caught among the vines V, under the vine reel 39. The shaker conveyor 37 rotates in a clockwise direction as indicated in FIG. 3, to carry the vines V from under the shaker brush 16. The vine reel 39 is rotated in a counter clockwise direction as indicated so that near the shaker conveyor 37 the tines 91 move in the same direction as the shaker conveyor 37. As viewed in FIG. 3, the tines 91 on the left side of the vine reel 39 enter the vines V in a substantially vertical downward direction with a substantially zero velocity along the direction of movement of the shaker conveyor 37. The tines 91 on the bottom of the vine reel 39 pass over the shaker conveyor 37 with a velocity along the direction of movement of the shaker conveyor 37, which is substantially twice the velocity of the shaker conveyor, and with a vertical velocity of substantially zero.

As viewed in FIG. 3, the tines 91 on the right side of the vine reel 39 leave the vines V in a substantially vertically upward direction with a substantially zero velocity along the direction of movement of the shaker conveyor 37. Therefore, as the tines 91 move from left to right under the vine reel 39, as viewed in FIG. 3, the tines 91 go from a substantially zero velocity along the direction of the shaker conveyor 37, to twice the velocity of the shaker conveyor 37 along the direction of the shaker conveyor 37, to a substantially zero velocity along the direction of the shaker conveyor 37. The change in velocity of the tines 91 with respect to the movement of the shaker conveyor 37, causes the vines V which engage the tines 91 to be agitated and separated allowing loosened tomatoes T, which are caught between the vines V, to escape from between the vines V and pass through the shaker conveyor 37 to the food conveyor 35. By keeping the tines 91 substantially vertical, the tines 91 can be easily inserted into and removed from the vines V, and are useful in separating the vines V.

The food conveyor 35 carries the tomatoes T forward on the harvester H and discharges them onto either of the two food cross conveyors 34, with only the left food cross conveyor 34 being shown in FIG. 2.

The tomatoes T which have fallen onto fruit cross conveyor 34 are discharged onto the sorter conveyor 27 where the tomatoes T join the other tomatoes T directed there by the left dirt cross conveyor 30. The tomatoes which have fallen onto the other food cross conveyor 34 are discharged to the other side of the harvester H where they join the second processing line. The tomatoes T discharged from the sorter conveyor 27, having been manually and mechanically sorted to remove undesirable tomatoes and debris, are directed to an automatic color sorter 40 where further undesirable tomatoes may be ejected from the harvester H. A suction fan and suction fan housing 38 are provided to further remove debris before the debris reaches the color sorter 40. Undesirable tomatoes which are ejected from the harvester H by the color sorter 40, are directed onto the recovery cross conveyor 95 where they can be further inspected.

The inspected tomatoes are then discharged onto the cross feed conveyor 41 where they join the inspected tomatoes from the other side of the harvester H, all tomatoes T then being directed to the right hand side of the harvester H. From the cross feed conveyor 41, the tomatoes T are directed to the discharge conveyor 42 where the tomatoes T are elevated and discharged into a receiving truck TR (FIG. 1) which travels alongside the harvester H.

In another preferred embodiment of this invention, the undesirable tomatoes and debris pulled from an after sort conveyor 64, are placed onto a recovery sorter conveyor 99 which runs underneath the after sort conveyor 64. This recovery sorter conveyor 99 directs the undesirable tomatoes and debris onto the recovery cross conveyor 95, where they can be further inspected.

The shaker conveyor 37 comprises a first endless belt 45 and a second endless belt 47 with a plurality of metal rods 49 extending in parallel there between. The plurality of rods 49, extending from the first endless belt 45 to the second endless belt 47, are spaced apart to allow tomatoes T to pass between the rods 49 to the food conveyor 35 below the shaker conveyor 37. Preferably, the rods 49 are spaced at a distance "d1" in the range of 3 inches to 6 inches apart. In the most preferred embodiment, the plurality of rods 49 are spaced a distance "d1" of 4 inches apart.

The food conveyor 35 also comprises first and second endless belts 83 with a plurality of metal rods 84 extending in parallel there between. Preferably, the rods 84 are spaced at a distance "d2" of 0.5 inches to 2 inches apart. In the most preferred embodiment, the spacing between the metal rods 84 of the food conveyor 35 is a distance "d2" of 1 inch apart. The shaker conveyor 37 extends almost to the dirt cross conveyors 29, 30, under the roller 33, under the feeder bars 31, under the shaker brush 16, and under the vine reel 39. The shaker conveyor 37 surrounds the food conveyor 35 and the food cross conveyors 34, so that part of the shaker conveyor 37 is above the food conveyor 35 and the food cross conveyors 34 and part of the shaker conveyor 37 extends under the food conveyor 35 and the food cross conveyor 34. Because the metal rods 49 extend across the shaker conveyor 37, the shaker brush 16 is positioned sufficiently above the shaker conveyor 37 so that the tines 19 of the shaker brush 16 do not reach or pass through the shaker conveyor 37.

In operation, the transfer conveyor 28 discharges vines V with attached tomatoes T to a set of feeder bars 31. The feeder bars 31 direct the vines V under a shaker brush 16. Gravity and bearing friction pull the vines V from the feeder bars 31 to a shaker conveyor 37 which moves the vines V in a rearward direction under the shaker brush 16. Falling from the feeder bars 31 to the shaker conveyor 37 allows the vines V to fall out of the shaker head assembly, allowing the volume 5 of the vine mass to expand. The expansion of the vine mass, provides a separation of the vines V, allowing loosened tomatoes to drop from the vine mass, through the shaker conveyor 37 to the food cross conveyor 34.

Although extending the conveyor so that vines V may drop out of the shaker brush 16 and moving the vines V through the shaker brush 16 by use of the shaker conveyor 37 improves the release of the tomatoes T from the vines V, some loosened tomatoes are still caught in the vine mass. For this reason, the shaker conveyor 37 causes the vines V with loosened tomatoes to pass below a vine reel 39. The vine reel 39 separates the vines V and allows tomatoes T to fall through the vines V and through the shaker conveyor 37 to a food conveyor 35.

The tomatoes, dirt and other debris which have fallen onto the recovery cross conveyor 95 are discharged from the recovery cross conveyor 95 through a dirt sorter electronic system 32, where the red tomatoes are retrieved back onto a longitudinal recovery feed conveyor 93. The dirt, debris, and green tomatoes fall off the recovery cross conveyor 95 through the dirt sorter electronic system 32 to a trash chute and then to the ground. Red tomatoes which have been retrieved back onto the longitudinal recovery feed conveyor 93 are then discharged onto the cross feed conveyor 41 where they join the inspected tomatoes from the other side of the harvester H, all tomatoes T then being directed to the right hand side of the harvester H. From the cross feed conveyor 41, the tomatoes T are directed to the discharge conveyor 42 where the tomatoes T are elevated and discharged into a receiving truck TR (FIG. 1) which travels alongside the harvester H.

The invention is an improvement over the apparatus described in U.S. Pat. No. 5,860,859 incorporated by reference, in that this invention provides a recovery system which reduces food losses from the main recovery system, the handsorters, and the color sorters. The apparatus described in U.S. Pat. No. 5,860,859 causes a nominal amount of red tomatoes to fall to the ground as trash due to inaccurate sorting by the handsorters and the color sorters. Moreover, since not all the tomatoes T are shaken from the vine V by the shaker brush, many tomatoes T fail to get inspected since they remain entangled with the vines V. In this invention, a recovery shaker conveyor 97 is added beneath the shaker conveyor 37 to loosen more tomatoes T from the vine V. In addition, a recovery cross conveyor 95 is added beneath the recover shaker conveyor and the color sorter 40 in order to recover additional tomatoes T. This improved recovery system is able to recover a greater amount of desirable tomatoes T.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A harvester for harvesting and separating above-ground food from vines comprising:
 a main frame;
 a shaker brush having a plurality of tines, and mounted on the main frame for rotation about an axis, the shaker brush being adjacent to a feed point;
 a plurality of feeder rods mounted to the main frame, extending from locations below the feed point to locations within the shaker brush;

a shaker conveyor for conveying food and vines away from the feeder rods;

a cross conveyor below the shaker brush for removing dislodged food from the harvester, a recovery shaker conveyor located beneath the end of the shaker conveyor for further separation of food from vines which have Men off the end of the shaker conveyor;

a recovery cross conveyor surrounded by said recovery shaker conveyor and in communication with both the shaker conveyor and the recovery shaker conveyor for removing additional dislodged food from the harvester;

an electronic sorter at one end of the recovery cross conveyor for further inspection of food fallen onto the recovery cross conveyor; and a discharge conveyor for removing food from the harvester.

2. A harvester as claimed in claim 1, wherein the recovery shaker conveyor comprises:

a first endless belt extending under the shaker conveyor;

a second endless belt extending under the shaker conveyor; and a plurality of rods extending from the first endless belt to the second endless belt.

3. A harvester as claimed in claim 2, wherein the plurality of rods of the recovery shaker conveyor are spaced apart from each other by a distance of about 3 to 6 inches.

4. A harvester as claimed in claim 2, wherein the plurality of rods of the recovery shaker conveyor are spaced apart a distance of about 4 inches.

5. A harvester as claimed in claim 1, further comprising a transfer conveyor for feeding food and vines to the feed point.

6. A harvester for harvesting and separating above-ground food from vines comprising:

a main frame;

a shaker brush having a plurality of tines, and mounted on the main frame for rotation about an axis, the shaker brush being adjacent to a feed point;

a plurality of feeder rods mounted to the main frame, extending from locations below the feed point to locations within the shaker brush;

a shaker conveyor for conveying food and vines away from the feeder rods and for supporting the food and vines in a position so that the tines on the shaker brush penetrate the vines and induce a shaking action in the vines;

a cross conveyor below the shaker brush for removing dislodged food from the harvester;

a recovery shaker conveyor located beneath the end of the shaker conveyor for further separation of food from vines which have fallen off the end of the shaker conveyor, a recovery cross conveyor surrounded by said recovery shaker conveyor; and a discharge conveyor in communication with both the shaker conveyor and the recovery shaker conveyor for discharging food from the harvester.

7. A harvester as claimed in claim 6, further comprising, an electronic sorter at one end of the recovery cross conveyor, for further inspection of food fallen onto the recovery cross conveyor from the recovery shaker conveyor.

8. A harvester as claimed in claim 6, further comprising a recovery feed conveyor for feeding food from the recovery cross conveyor to a truck which travels alongside the harvester.

9. A harvester as claimed in claim 6, further comprising a recovery sorter conveyor for feeding additional food onto the recovery cross conveyor.

10. A harvester as claimed in claimed 6, further comprising a food conveyor surrounded by the shaker conveyor for feeding food received from the shaker conveyor to a color sorter.

11. A harvester as claimed in claim 10, wherein the recovery cross conveyor is surrounded by the recovery shaker conveyor and adjacent to the color sorter, for catching food and vines which have fallen off the recovery shaker conveyor and the color sorter.

12. A harvester as claimed in claim 11, further comprising a recovery sorter conveyor for feeding additional food onto the recovery cross conveyor.

13. A harvester as claimed in claim 6, further comprising a transfer conveyor for feeding food and vines to the feed point.

14. A harvester as claimed in claim 6, wherein the shaker conveyor is mounted outside of the shaker brush, so that the plurality of tines of the shaker brush do not reach the shaker conveyor.

15. A method for recovering above-ground food, comprising the steps of:

collecting food and vines onto a main frame;

feeding the food and vines to a feed point;

directing the food and vines through a shaker brush having a plurality of tines, and mounted on the main frame for rotation about an axis, the shaker brush adjacent to the feed point;

guiding the food and vines through a plurality of feeder rods mounted to the main frame, extending from locations below the feed point to locations within the shaker brush;

feeding the food and vines onto a shaker conveyor for conveying food and vines away from the feeder rods and or supporting the food and vines in a position so that the tines on the shaker brush penetrate the vines and induce a shaking action in the vines, causing a separation of at least some of the food from the vines;

retrieving dislodged food fallen from the shaker brush with a cross conveyor located below the shaker brush;

directing food and vines not separated to a recovery shaker conveyor located beneath the end of the shaker conveyor for further separation of food from vines;

retrieving dislodged food fallen from the recovery shaker conveyor with a recovery cross conveyor;

directing food from the cross conveyors to a discharge conveyor;

and discharging the food from the discharge conveyor.

16. The method of claim 15, further comprising the step of feeding additional food onto the recovery cross conveyor with a recovery sorter conveyor.

17. The method of claim 15, further comprising the step of feeding food received from the shaker conveyor to a color sorter with a food conveyor which is surrounded by the shaker conveyor.

18. The method of claim 17, wherein the recovery cross conveyor is surrounded by the recovery shaker conveyor and adjacent to the color sorter, for catching food and vines which have fallen off the recovery shaker conveyor and the color sorter.

19. The method of claim 18, further comprising the step of feeding additional food onto the recovery cross conveyor with a recovery sorter conveyor.

* * * * *